Dec. 17, 1935.     P. H. CHASE     2,024,144
METHOD OF SEASONING CABLE
Filed Jan. 25, 1930     3 Sheets-Sheet 1
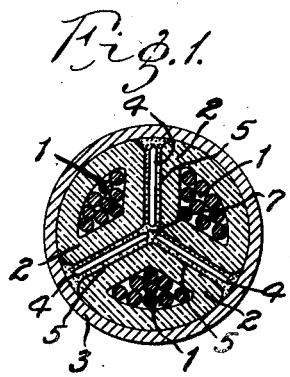
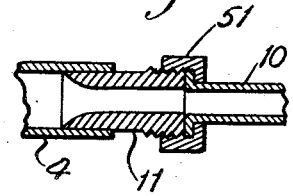
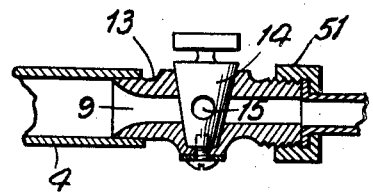
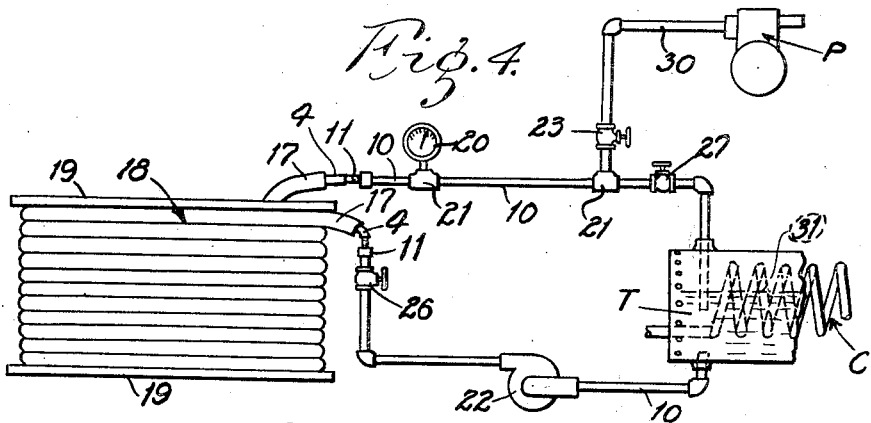
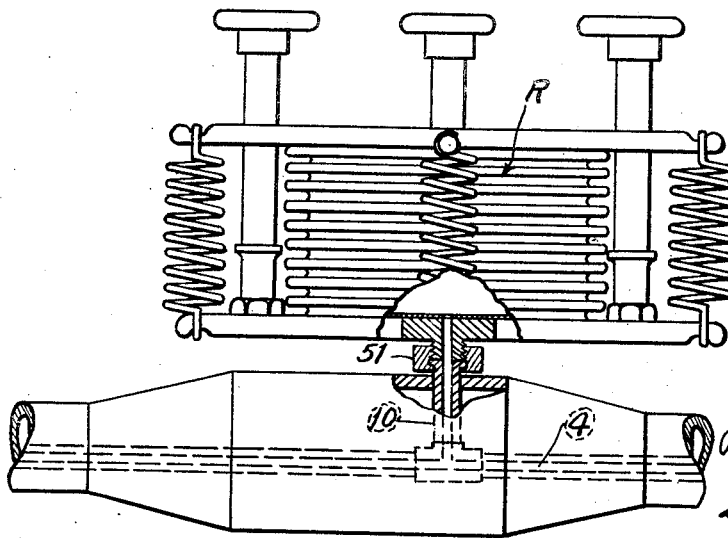

Dec. 17, 1935. P. H. CHASE 2,024,144
METHOD OF SEASONING CABLE
Filed Jan. 25, 1930 3 Sheets-Sheet 3

Philip H. Chase
Inventor.
Delos G. Haynes
Attorney

Patented Dec. 17, 1935

2,024,144

UNITED STATES PATENT OFFICE 2,024,144

METHOD OF SEASONING CABLE

Philip H. Chase, Bala-Cynwyd, Pa.

Application January 25, 1930, Serial No. 423,569

7 Claims. (Cl. 173—244)

This invention relates to cable, including the manufacture, installation and operation thereof, and more particularly to cable of the type having one or more expansion members therein.

Among the several objects of the invention may be noted the provision of methods and means for controlling the pressure within a cable during manufacture, test and installation thereof; the provision of methods and means for heating or cooling a cable during manufacture, test and installation; the provision of methods and means for adjustment of the fluid in cable expansion members; the provision of means for seasoning a cable before it is placed in operation; and the provision of means for cooling the cable internally of its sheath, during operation. Other objects will be in part obvious and in part pointed out hereinafter.

The invention accordingly comprises the elements and combinations of elements, features of construction and operation, arrangements of parts, steps and sequence of steps which are exemplified in the structure hereinafter described and the scope or application of which will be indicated in the following claims.

In the accompanying drawings in which are illustrated several embodiments of the invention, Fig. 1 is a cross section exemplifying the class of cable to which the invention applies;

Fig. 2 is a fragmentary longitudinal section illustrating a fluid connection between certain expansible members and a circulating system;

Fig. 3 is a view similar to Fig. 2 showing a valved connection alternative to that shown in Fig. 2;

Fig. 4 shows a reel of cable connected with a fluid circulating system;

Fig. 5 is a side elevation of a reservoir, certain portions being broken away;

Similar reference characters indicate corresponding parts throughout the several views of the drawings.

Figure 6:
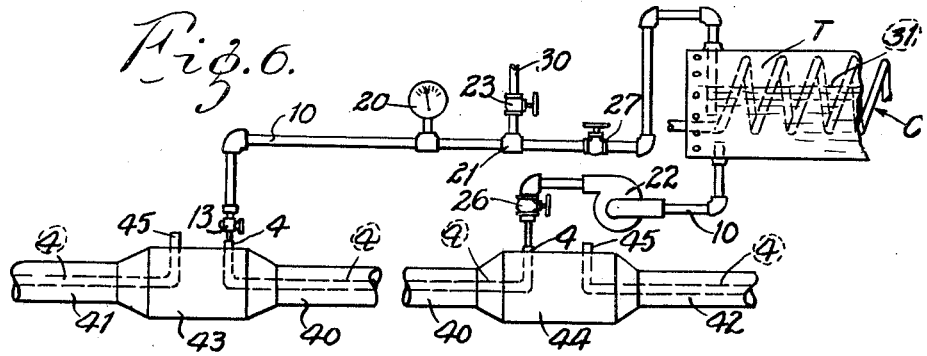
Fig. 6 is a piping diagram showing an interconnected system including the expansible members of a cable.

Referring now more particularly to Fig. 1, there are illustrated at numerals 1 conductors. The conductor insulation is illustrated by numeral 2, and the outer sheath by numeral 3. One or more expansion members, or expansible hollow tubes or tapes are designated by numerals 4. Lateral spaces designated by numerals 5 and the central space designated by numeral 7, are preferably filled with solid filler material. The voids in the conductors, insulation and fillers are preferably entirely filled with a suitable impregnating, insulating compound or oil.

The longitudinal hollow tubes 4 are constructed of a suitable strong flexible material, such as copper, for example, with walls impervious to the impregnating compound or oil. They may contain either a gaseous or a liquid fluid. These expansion members are preferably continuous from end to end of each cable length or may comprise a series of hollow tubes connected together so that the fluid therein can pass serially therethrough. The detailed method of, and means for connecting and filling these hollow tubes during manufacture, test, installation and operation will be determined by the various conditions to be described herein, but it is to be understood that they all come within the invention herein disclosed.

The hollow tubes are preferably introduced during the process of cabling the insulated conductors together. Or, the hollow tubes or tapes may be incorporated in the conductor, or in the fillers, or under the outer sheath at other appropriate stages in the manufacture of the cable. During incorporation in the cable, the hollow tubes may contain the same or a different fluid from that to be utilized during operation, and they may be introduced in a contracted shape, such as with the side tube walls touching or practically touching, or in a relatively expanded shape. It will be understood that other shapes not corresponding to the original one in which the hollow tubes are manufactured may be effected by increasing or decreasing the internal pressure within said hollow tubes. The tubes in any event will terminate at or adjacent the ends of the cable length, and will be adapted, by means of fittings soldered or clamped to the tube ends, for closing or for connecting pressure or fluid-introducing means.

For instance, Fig. 2 illustrates a fitting 11 which is adapted to connect the tube 4 to a pipe 10 through which connections are made to pumps, oil and gas containers, gauges and the like. One end of the fitting or nipple 11 is preferably soldered to the tubing 4 and the other end is threaded for the reception of a jamb nut or cap 51 to retain the end of the tube 10.

Fig. 3 illustrates an alternative form of fitting 13 fitted with a tapered member 14 to serve as a shut-off valve, open when the hole 15 registers with the passage 9, and closed when the cock is turned 90° from the open position.

Thus after the hollow tube or tubes have been introduced into or applied to the cable core, pressure or vacuum may be applied to them through the fittings of Figs. 2 and 3 at one or both ends, for example by means of a pump, in order to detect faults or leaks through the tube walls and, if desired, to expand or contract the tubes to a predetermined area of cross section. For example, Fig. 4 illustrates a reel or support 18 for manufacture and/or transportation of cable, in which the reel flanges are designated by numeral 19, the cable ends by numeral 17, and the hollow tube or tubes by numeral 4, connected to a control system. For a test for tube leakage, valves 26 and 27 are closed and valve 23 is opened. The valves 26 and 27 are in circulating pipes 10 (now cut off), in the lower branch of which is located a pump 22 and in the upper branch a suction or pressure pipe 30 (including valve 23) which passes to a vacuum or pressure pump P. Whether the pump P exerts a vacuum or pressure depends on conditions to be described. The application of pressure (or vacuum) to pipe 30 will exert pressure (or vacuum) through the upper pipes 10, fittings 21 and 11 on the tube 4, throughout its length in the cable and to the now closed valve fitting 26. The valve fittings 23, 26 and 27 may be of the type described in Fig. 3. By means of the pressure (or vacuum) gauge 20 the pressure on the tube 4 can be known and hence adjusted to the desired value, and leaks may be detected by a change in pressure as indicated on gauge 20 and/or by visual or other inspection of the cable.

During and immediately following the impregnating process it is preferable for the hollow tube or tubes to be similarly connected to pressure gauges and be under pressure (when the vacuum is being applied to the cable in the impregnating tank), in order to detect leaks in the hollow tubes.

The hollow tubes may also be utilized for more rapid heating or cooling of the cable, by circulating through the tubes suitable gases or liquids, such as air or thin oil for example, heated or cooled to the desired temperature. For this purpose the system of Fig. 4 is operated with the valves 26 and 27 open and valve 23 closed, thus connecting the tubes 4 to a fluid containing tank T, partly or wholly filled with fluid 31. In the pipe line to the lower side of the tank is shown a circulating pump 22 driven by a motor, which circulates the fluid in a closed path from the tank through the valves 26, the tubes 4 in the cable, the fittings 11 and 21, the valve 27 and thence back to the tank. Pressure may be applied simultaneously by a pressure pump connected to pipe 30 by opening valve 23. Heating or cooling of the fluid in the tank may be effected by the addition of heat to or the removal of heat from the walls of the tank or by means of heating or cooling coils C within the tank.

During the sheathing process, the amount and/or pressure of gas or liquid in the hollow tube or tubes may be changed by the above described means, in order to bring the tube cross section to a predetermined value before or while a sheath is being applied, in order that the expansion and contraction of the tubes during operation will fall within desired limits. However, if it be desired to provide more fully for stretching of the outer sheath (particularly if it is lead) during manufacture and installation, or if it is desired to insure against voids in the cable by purposely stretching the sheath after installation, for example, the gas or liquid in the tube or tubes during the sheathing operation is removed or the quantity is reduced to allow the tube cross section to become a predetermined minimum.

When the cable lengths are being tested, for example, for dielectric loss, and power factor, or dielectric strength, the internal pressure and/or temperature of the cable can, by means of this invention, be brought to and maintained at predetermined values and thus further stabilize test conditions. This is done by applying the desired pressure and/or heat to the hollow tube or tubes, by the above described means.

After the application of the outer sheath, and particularly during shipment, storage and installation, it is preferable for the hydrostatic internal pressure of the cable to be at or slightly in excess of atmospheric pressure at all times, so that there will be no entrance of air into the cable, in case there should be a leak in the outer sheath, or when the cable ends are opened, as, for example, for splicing. For this purpose the hollow tube or tubes are filled with a predetermined amount of liquid or gas. When a liquid filler is used, an expansion reservoir is connected to each hollow tube or group of tubes. Fig. 5 illustrates a spring-loaded bellows type of closed reservoir R connected to a pipe 10, the latter being connected to the tube or tubes 4 within the cable.

As the temperature of the different parts of the cable length changes and there is a difference in the rate of expansion of those parts, with a relatively inelastic outer sheath there is a change in the hydrostatic pressure on the impregnating compound or oil and consequently on the walls of the hollow tubes. When the external pressure on the walls of the hollow tubes is greater than the internal pressure, the walls will move inwardly, thus reducing the area cross section of the hollow tubes. Conversely, when the external pressure on the walls of the hollow tubes is less than the internal pressure, the walls will move outwardly, thus increasing the area cross section. The movement of the walls of the hollow tubes will continue until there is substantial equalization of pressure.

With a liquid filler in the hollow tubes at least one expansion tank such as shown in Fig. 5 is mounted on the cable reel and is connected to each hollow tube or to a group of tubes, in the cable length on the reel. Also, with a gaseous filler for the hollow tubes, an expansion tank may be utilized, but is unnecessary under normal conditions because a gas is itself expansible. For example, the hollow tubes may open to the outside air, or they may be sealed at the ends and in the latter case the gas will be compressed to a smaller volume by a decrease of cross section of the hollow tubes, and will expand to a greater volume by an increase of cross section, with respectively inverse changes in pressure. With such expansion tanks or openings to the outside air, part of the fluid in the hollow tubes will pass lengthwise of the cable length (with or without substantial compression in the case of gaseous fillers) to and from the reservoirs (or alternatively to openings to the outside air) as the pressure within the cable is greater or less in the reservoirs or at the openings to the outside air.

After the cable lengths have been installed, the hollow tubes or tapes may be connected in various ways, (see Figs. 8 to 13).

Figure 8:
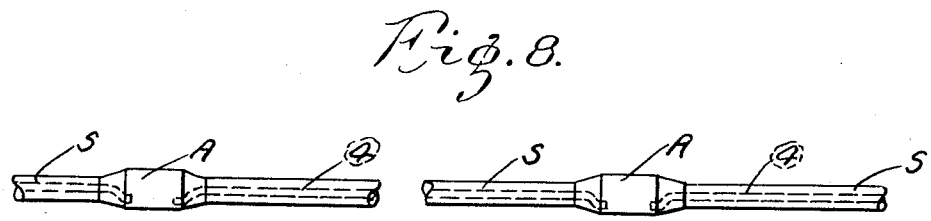
Figs. 8 to 13 are schematic illustrations of systems for interconnecting cable expansible members with one another and/or reservoirs.

For instance, a system of hollow tubes without connections or reservoirs is illustrated schematically in Fig. 8. The cable sections S are connected by splices A but the hollow tubes 4 are not connected with or in said splices.

Figure 10:

Fig. 10 shows a construction similar to Fig. 8, except that the adjacent cable lengths are joined by small connecting pipes B.

Figure 9:
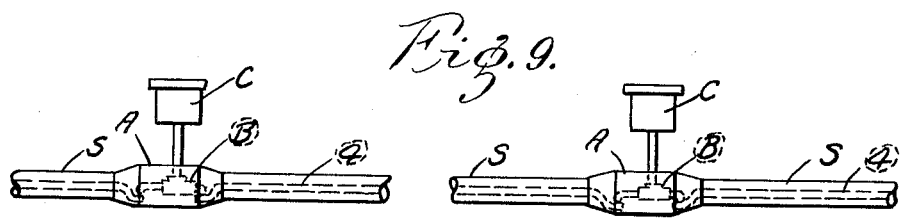

Fig. 9 shows reservoirs C in connection with the small connecting pipes B.

Figure 11:
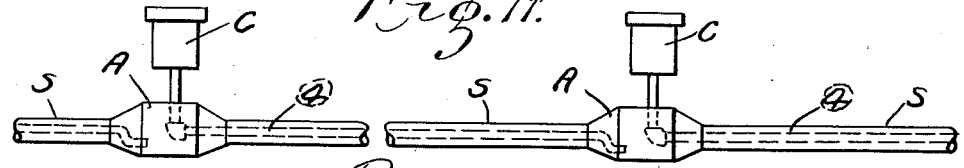

In Fig. 11 the reservoirs C are used in connection with the separated tubes of Fig. 8.

Figure 12:
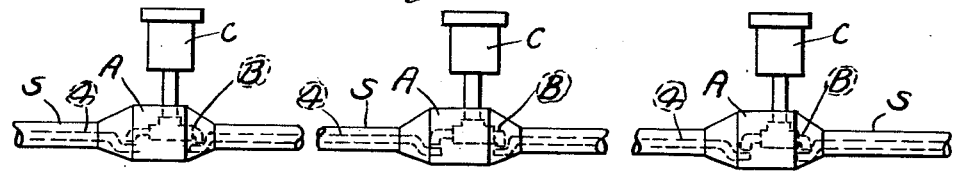
Figure 13:
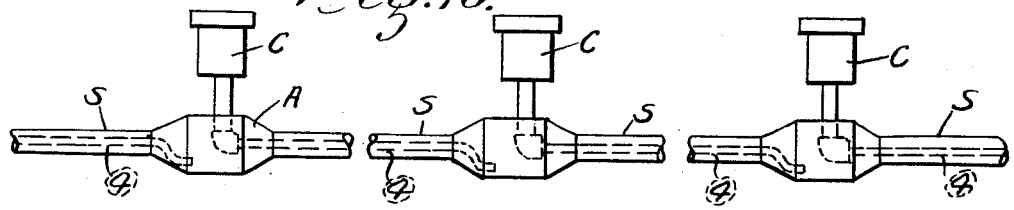

A system of hollow tubes, connections B and reservoirs D is shown in Fig. 12. Fig. 13 shows similar reservoirs D used on non-connecting hollow tube lengths.

The description of Figs. 8 to 13 is given by way of clarification of the application of the tubes 4 to the cable.

It is to be understood that the reservoirs may be closed or open as the installation and/or operating conditions require, and that with gaseous fluids the reservoirs of Figs. 9, 11, 12 and 13 may be omitted and the connections from the tubes to the outside of the cables either may be closed or may be left open to atmosphere through properly guarded openings. Furthermore, the hollow tubes 4 may be separated at points within a given section of cable S. In this case circulation of fluid may not be had unless internal return connections are made but the pressure changing methods herein described may be used without return connections.

Figure 7:
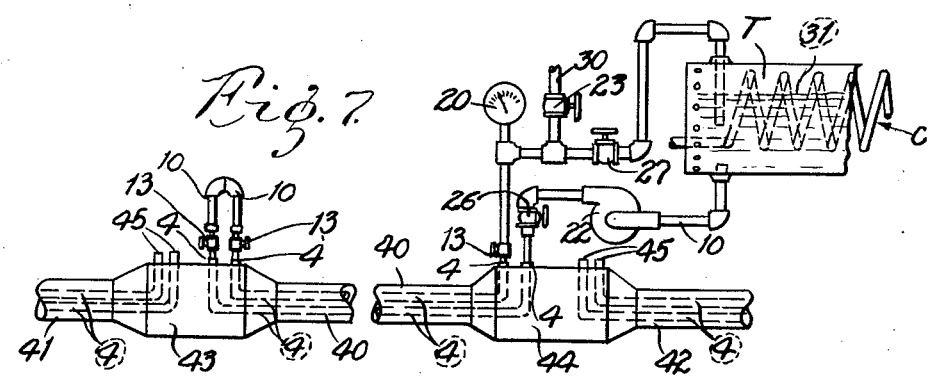
Fig. 7 is a view similar to Fig. 6 showing a modification.

Either during the construction of the cable splices or preferably after their completion, by the application of pressure the hollow tubes may be utilized to detect the presence of leaks in the outer sheath and/or to adjust or season the cable prior to placing it in operation. Means and methods corresponding to those described in Fig. 4 are utilized for these purposes but modified as shown in Figs. 6 and 7, and described hereinafter.

By the above used terms "adjusting" or "seasoning" is meant the process of introducing liquid or gaseous filler into the hollow tubes within the cable so as to compensate for sheath stretching prior thereto and/or to purposely stretch the sheath and/or to equalize the distribution of compound throughout the cross section and length of the cable, and/or to minimize the void content of the cable. Particularly in high-voltage cables it may be desirable to season the cable before its rated voltage is applied, in order to assure that the void content has been minimized and that the compound distribution is equalized. After adjusting or seasoning, and prior to placing in operation, the predetermined pressure-volume-temperature operating characteristics are established by the quantity of liquid or gas filler in or introduced into the tubes.

The application of pressure to the tube ends, utilizing either gas or liquid as the filler for the tubes, will increase the area of cross section of the tubes and consequently exert pressure on the impregnating compound or oil, thus causing it to flow into areas or sections of the cable which were at lower pressure and filling the void spaces that may have formed there. The pressure may be carried to values above that predetermined for regular operation and even to a value which will stretch the lead sheath slightly in order to assure the greatest minimization of void space and/or to expand the hollow tubes from the area of cross section selected for manufacturing convenience to a greater area required for the proper operation of the cable. During the seasoning process there may also be a release of pressure and further applications and releases of pressure, to assure the efficacy of the seasoning process.

During the seasoning process, circulation or passage through the hollow tubes of heated gas or liquid may also be of advantage, particularly under certain conditions; for example, if the impregnating compound is viscous or is materially thickened by low temperature. Heated air or oil, for example at or near the maximum operating temperature of the cable may be passed through the tubes and produce expansion and mobility of the cable parts sufficiently close to conditions under operation to effectually season the cable more rapidly than without heat under certain conditions.

Such applications of pressure and/or heat during the seasoning process may be made to each cable length separately, or to several cable lengths simultaneously, the choice depending upon particular conditions and convenience. For example, certain electrical tests may be required at predetermined temperature and pressure conditions. After the application of pressure and/or heat, the ends of the hollow tubes, if not left open to the outside air, are closed and/or sealed, or connected to reservoirs or expansion tanks, under predetermined pressure-temperature-volume conditions.

Provisions are preferably made so that connections to the hollow tube ends can be made conveniently from time to time after the cable is in operation in order to determine the extent and nature of changes in pressure and fluid volume which may have taken place, and make the necessary adjustments thereto.

In case it is desired to cool the cable internally, passage or circulation of the gaseous or liquid filler through the hollow tubes may be employed. In such case, the area cross section and number of the tubes will be determined, among other things, by the character of the cooling medium, its velocity of flow, the distance of travel in the cable and the inlet and outlet temperatures. The cooling medium in the tubes may be kept under a predetermined pressure during its passage through the hollow tubes, for example by throttling by effecting reduced areas at the discharge openings, or by recirculating through a closed system (preferably utilizing the hollow tubes for the return path) including radiators or cooling coils for cooling the medium.

Fig. 6 illustrates a length or lengths of cable 40, 40, installed and connected to adjacent lengths 41 and 42 by splices 43 and 44 respectively. The continuous or connected expansible tube 4 in cable length or lengths 40 is connected at the ends through valve fittings 13 and 26 to a system of piping and valves with pressure gauge, pressure pump, and circulating pump, similar to that of Fig. 4. The tube ends from cable lengths 41 and 42 are indicated by numeral 45. By this system, each length, or group of associated lengths of cable, can be tested and seasoned after installation, with control of pressure, and if desired the circulation of heated or cooled medium through the tubes.

Fig. 7 illustrates an arrangement similar to Fig. 6 in which the cable contains two tubes 4, and one of them replaces the long tube 10 between fittings 20 and 13 of Fig. 6.

After tests and seasoning, the apparatus of

Figs. 6 or 7, external to the cable, is disconnected and the tube ends are sealed up or connected to reservoirs such as shown in Figs. 8 to 14 with the predetermined amounts of liquid or gas contained therein, or may be left open to atmosphere through properly guarded openings. In case it is desired to cool the cable during operation, the circulating pump 22 will be retained to force the cooling medium through the tubes 4, and the tank 30, or its equivalent, with cooling means will be retained in case the cooling medium is to be recirculated.

It is to be understood that certain classes of liquid within the tape are more desirable than others, depending upon particular circumstances.

From the above it will be seen that there is provided a method of adjusting or seasoning cable before commercial operation thereof, or after one or more commercial operations and before subsequent ones, said adjustment being made by means of the introduction of optimum pressure and temperature conditions into the expansible tubing in the cable, whereby the relationship between cable parts when they are subsequently in use is substantially at the optimum relationship desired.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. The method of seasoning cable throughout a predetermined length before a subsequent operation thereof, the cable being characterized by an assembly of at least one expansible tube having an outlet and conductors and filler within a sheath, comprising attaching forcing means to said outlet, supplying fluid to the forcing means, forcing said fluid into the expansible tube, and maintaining the pressure in the tube at such value that an optimum relationship between the parts of the cable assembly exists during subsequent operation of the cable.

2. The method of seasoning cable throughout a predetermined length before a subsequent operation thereof, the cable being characterized by an assembly of at least one expansible tube having an outlet and conductors and filler within a sheath, comprising attaching forcing means to one end of said expansible tube, supplying fluid to the forcing means forcing said fluid into the expansible tube, maintaining the pressure in the tube at such value that an optimum relationship between the parts of the cable assembly exists during subsequent operation of the cable, and returning the fluid to said forcing means from said outlet.

3. The method of seasoning cable throughout a predetermined length before a subsequent operation thereof, the cable being characterized by an assembly of at least one expansible tube having an outlet and conductors and filler within a sheath, comprising attaching forcing means to said outlet, supplying fluid to the forcing means, forcing said fluid into the expansible tube, maintaining the pressure in the tube at such value that an optimum relationship between the parts of the cable assembly exists during subsequent operation of the cable, and controlling the temperature of the fluid.

4. The method of seasoning cable throughout a predetermined length before a subsequent operation thereof, the cable being characterized by an assembly of at least one expansible tube having an outlet and conductors and filler within a sheath, comprising attaching forcing means to one end of said expansible tube, supplying fluid to the forcing means, forcing said fluid through the expansible tube, maintaining the pressure in the tube at such value that an optimum relationship between the parts of the cable assembly exists during subsequent operation of the cable, returning the fluid to said forcing means, whereby a circulating system is effected predeterminately, controlling the temperature of the fluid in said circulating system, and throttling the circulating system for controlling said pressure.

5. The method of seasoning cable throughout a predetermined length before a subsequent operation thereof, the cable being characterized by an assembly of at least one expansible tube having an outlet and conductors and filler within a sheath, comprising attaching forcing means to one end of said expansible tube, supplying fluid to the forcing means, forcing said fluid through the expansible tube, maintaining the pressure in the tube at such value that an optmum relationship between the parts of the cable assembly exists during subsequent operation of the cable, returning the fluid to said forcing means, throttling the circulating system for controlling said pressure, and controlling the temperature of the fluid in the circulating system.

6. The method of seasoning cable having an impermeable, expansible tube therein which is in a state other than that assumed during operation, the seasoning being effected throughout a predetermined length of the cable before a subsequent operation thereof, comprising attaching forcing means to one end of said expansible tube, supplying fluid to the forcing means, and varying the pressure applied to the tube outside of the range of the pressures which will occur in operation, in order to effect an adjustment of the cable parts.

7. The method of seasoning cable having an impermeable, expansible tube therein which is in a state other than that assumed during operation, the seasoning being effected throughout a predetermined length of the cable before a subsequent operation thereof, comprising attaching forcing means to one end of said expansible tube, supplying fluid to the forcing means, varying the pressure applied to the tube outside of the range of the pressures which will occur in operation, in order to effect an adjustment, and predeterminately controlling the temperature of the fluid under pressure.

PHILIP H. CHASE.

CERTIFICATE OF CORRECTION.

Patent No. 2,024,144. December 17, 1935.

PHILIP H. CHASE.

It is hereby certified that error appears in the printed specification of the above numbered patent requiring correction as follows: Page 4, second column, line 23, claim 4, after the word "effected" insert a comma; and line 24, same claim, after the syllable "ly" strike out the comma; and that the said Letters Patent should be read with these corrections therein that the same may conform to the record of the case in the Patent Office.

Signed and sealed this 24th day of August, A. D. 1937.

Leslie Frazer (Seal) Acting Commissioner of Patents.